US011904320B2

(12) United States Patent
Zhu (10) Patent No.: US 11,904,320 B2
(45) Date of Patent: Feb. 20, 2024

(54) CENTRIFUGE TUBE, DETECTION SYSTEM AND DETECTION METHOD (71) Applicants: BEIJING BOE TECHNOLOGY DEVELOPMENT CO., LTD., Beijing (CN); BOE TECHNOLOGY GROUP CO., LTD., Beijing (CN)

(72) Inventor: Lin Zhu, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 301 days.

(21) Appl. No.: 17/279,161

(22) PCT Filed: May 13, 2020

(86) PCT No.: PCT/CN2020/089900
§ 371 (c)(1),
(2) Date: Mar. 24, 2021

(87) PCT Pub. No.: WO2020/228710
PCT Pub. Date: Nov. 19, 2020

(65) Prior Publication Data
US 2021/0387181 A1 Dec. 16, 2021

(30) Foreign Application Priority Data
May 13, 2019 (CN) .......................... 201910395030.X (51) Int. Cl.
*B01L 3/00* (2006.01)
*G01N 27/327* (2006.01)

(52) U.S. Cl.
CPC ........ *B01L 3/5082* (2013.01); *G01N 27/3271* (2013.01); *B01L 2300/0627* (2013.01); *B01L 2300/0858* (2013.01)

(58) Field of Classification Search
CPC ........... B01L 3/5082; B01L 2300/0627; B01L 2300/0858; G01N 27/3271
See application file for complete search history.

(56) References Cited

U.S. PATENT DOCUMENTS 5,858,199 A * 1/1999 Hanak ..................... C02F 1/469
 205/702
7,311,816 B2 12/2007 Kessler et al.
(Continued)

FOREIGN PATENT DOCUMENTS

CN 102759614 A 10/2012
CN 103616426 A 3/2014
(Continued)

OTHER PUBLICATIONS

First office action issued in Chinese Patent Application No. 201910395030.X with search report.

*Primary Examiner* — Jill A Warden
*Assistant Examiner* — Alex Ramirez
(74) *Attorney, Agent, or Firm* — Chiwin Law LLC (57) ABSTRACT A centrifuge tube, a detection system and a detection method. The centrifuge tube includes: a tube body comprising an inner surface and an outer surface, a sensor provided at the inner surface of the tube body and comprising a first electrode group; and a second electrode group provided at the outer surface of the tube body and electrically connected with the first electrode group.

18 Claims, 7 Drawing Sheets (56) References Cited

U.S. PATENT DOCUMENTS

| 9,205,424 B2 | 12/2015 | Endermann et al. |
| 2015/0153300 A1 | 6/2015 | Fan et al. |
| 2015/0298126 A1 | 10/2015 | Hoehl et al. |

FOREIGN PATENT DOCUMENTS

| CN | 104086786 A | 10/2014 |
| CN | 104797341 A | 7/2015 |
| CN | 105964314 A | 9/2016 |
| CN | 105964314 B | 1/2019 |
| CN | 109342519 A | 2/2019 |
| CN | 110095521 A | 8/2019 |
| JP | 02215375 A | 8/1990 |
| WO | 03037522 A1 | 5/2003 |
| WO | 2005059532 A1 | 6/2005 |

\* cited by examiner

Placing the substance to be detected into the centrifugal tube, and performing centrifugal treatment to obtain supernatant liquid and precipitate

↓

Contacting the working electrode of the electrochemical sensor with the supernatant liquid in the centrifugal tube, and electrically connecting the first lead-out electrode, the second lead-out electrode, and the third lead-out electrode with the detection device respectively

↓

Processing the electrical signal of the electrochemical sensor by using the detection device to obtain the concentration of the analyte in the substance to be detected

CENTRIFUGE TUBE, DETECTION SYSTEM AND DETECTION METHOD

CROSS REFERENCE TO RELATED APPLICATIONS

This application is a U.S. National Phase Entry of International Application No. PCT/CN2020/089900 filed on May 13, 2020, designating the United States of America and claiming priority to Chinese Patent Application No. 201910395030.X, filed on May 13, 2019. The present application claims priority to and the benefit of the above-identified applications and the above-identified applications are incorporated by reference herein in their entirety.

TECHNICAL FIELD

Embodiments of the present disclosure relate to a centrifuge tube, a detection system, and a detection method.

BACKGROUND

Traditional clinical detection for saliva component is mostly carried out in hospitals, and quantitative detection of saliva component markers mainly depends on immunological and biochemical methods, such as a culture method, PCR (Polymerase Chain Reaction), enzyme-linked immunosorbent assay, etc., which requires special personnel to carry out multi-step operation and is complicated to operate.

SUMMARY

At least one embodiment of the present disclosure provides a centrifuge tube comprising:
a tube body, comprising an inner surface and an outer surface;
a sensor, provided at the inner surface of the tube body and comprising a first electrode group; and
a second electrode group, provided at the outer surface of the tube body and electrically connected with the first electrode group.

At least one embodiment of the present disclosure provides a detection system, comprising: a detection device; and the centrifuge tube, according to any one of claims 1-12. The detection device is configured to be signally connected with the centrifuge tube to process an electrical signal provided by the sensor.

At least one embodiment of the present disclosure provides a detection method, comprising:
placing an substance to be detected into the centrifuge tube, performing a centrifugal treatment to obtain supernatant liquid and precipitate, and making the first electrode group of the sensor contact with the supernatant liquid in the centrifuge tube;
electrically connecting the second electrode group with the detection device; and
processing the electric signal of the sensor by using the detection device to obtain a value of a target parameter of an analyte in the substance to be detected.

BRIEF DESCRIPTION OF THE DRAWINGS

In order to clearly illustrate the technical solution of the embodiments of the present disclosure, the drawings of the embodiments will be briefly described in the following. It is obvious that the described drawings in the following are only related to some embodiments of the present disclosure and thus are not limitative of the present disclosure.

DETAILED DESCRIPTION

In order to make objectives, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," and the like are only used to indicate relative position relationship, and when the position of the described object is changed, the relative position relationship may be changed accordingly.

At least one embodiment of the present disclosure provides a centrifuge tube, a detection system, and a detection method. According to the technical scheme provided by the embodiments of the present disclosure, an substance to be detected is placed into a centrifuge tube, and the centrifuge tube is placed into a centrifuge for a centrifugal treatment; a sensor contacts the supernatant liquid in the centrifuge tube, and the detection device outputs an analysis result according to an electrical signal of the sensor, so that the operation of the detection method is simple and the problem of complex operation of existing detection method can be solved.

At least one embodiment of the present disclosure provides a centrifuge tube, and the centrifuge tube includes a tube body, a sensor, and a second electrode group. The tube body includes an inner surface and an outer surface. The sensor is arranged at the inner surface of the tube body and includes a first electrode group. The second electrode group is arranged at the outer surface of the tube body and electrically connected with the first electrode group.

Figure 1:
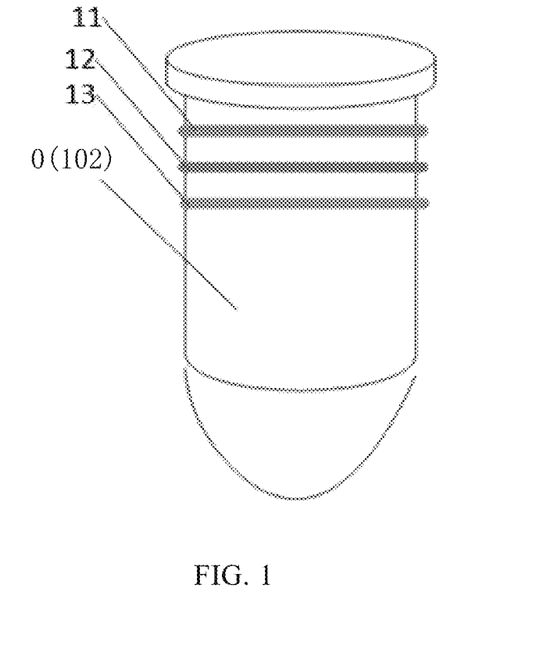
FIG. 1 is a schematic structural diagram of a centrifuge tube according to at least one embodiment of the present disclosure.
Figure 3:
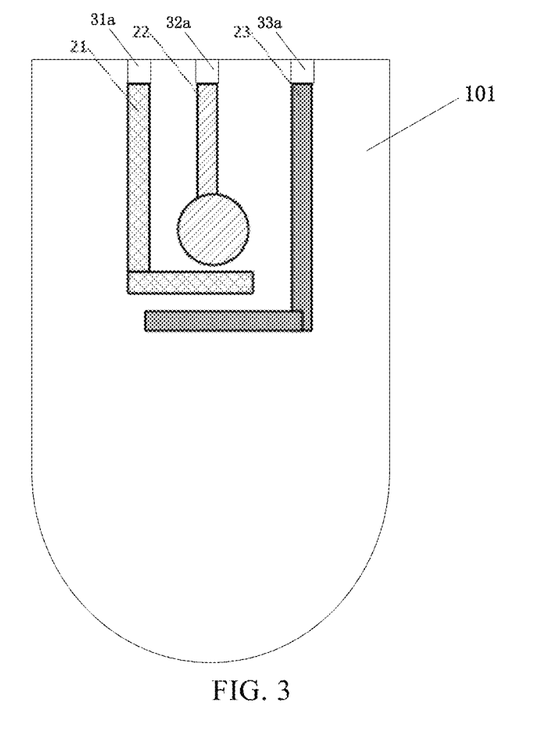
FIG. 3 is a schematic expanded diagram of an inner surface of a centrifuge tube provided by at least one embodiment of the present disclosure.
Figure 4:
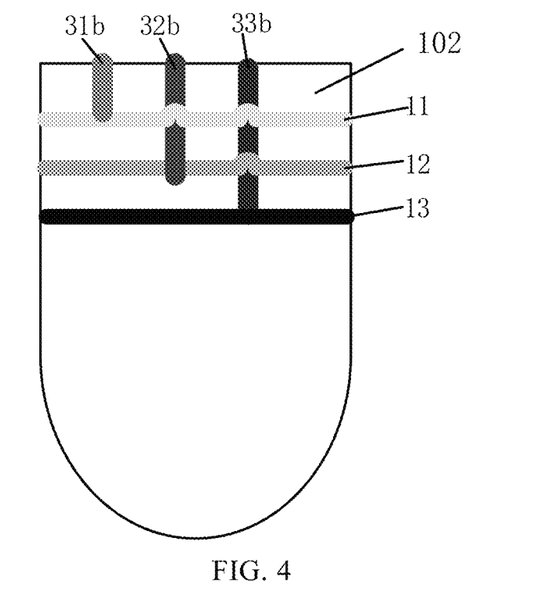
FIG. 4 is a schematic expanded diagram of an outer surface of a centrifuge tube provided by at least one embodiment of the present disclosure.
Figure 5:
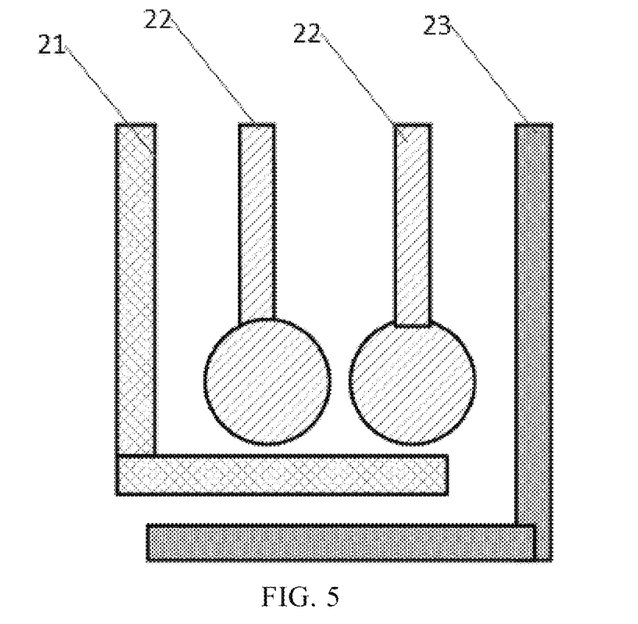
FIG. 5 is a schematic structural diagram of an electrochemical sensor in a centrifuge tube provided by at least one embodiment of the present disclosure.

FIG. 1 is a schematic structural diagram of a centrifuge tube according to at least one embodiment of the present disclosure. FIG. 3 is a schematic expanded diagram of an inner surface of a centrifuge tube provided by at least one embodiment of the present disclosure. FIG. 4 is a schematic expanded diagram of an outer surface of a centrifuge tube provided by at least one embodiment of the present disclosure. FIG. 5 is a schematic structural diagram of an electrochemical sensor in a centrifuge tube provided by at least one embodiment of the present disclosure. Referring to FIG. 1, FIG. 3, FIG. 4, and FIG. 5, a centrifuge tube according to at least one embodiment of the present disclosure includes a tube body 10, a sensor, a first lead-out electrode 11, at least one second lead-out electrode 12, and a third lead-out electrode 13.

The tube body 10 includes an inner surface 101 and an outer surface 102. The sensor is arranged at the inner surface 101 of the tube body 10. The sensor includes a reference electrode 21, a counter electrode 23, and at least one working electrode 22. The first lead-out electrode 11, the at least one second lead-out electrode 12, and the third lead-out electrode 13 are arranged at intervals on the outer surface 102 of the tube body 10. The first lead-out electrode 11 is electrically connected with the reference electrode 21, the at least one second lead-out electrode 12 is electrically connected with the at least one working electrode 22, and the third lead-out electrode 13 is electrically connected with the counter electrode 23. The at least one working electrode 22 is in one-to-one correspondence with the at least one second lead-out electrode 12.

The above-mentioned sensor can be, for example, an electrochemical sensor or a biosensor, which is not limited by embodiments of the present disclosure. In the present disclosure, each embodiment of the present disclosure will be described by taking an electrochemical sensor as an example.

The reference electrode 21, the counter electrode 23, and the at least one working electrode 22 are only examples of the first electrode group; and the first lead-out electrode 11, the at least one second lead-out electrode 12, and the third lead-out electrode 13 are only examples of the second electrode group, which is not limited by the embodiments of the present disclosure.

The reference electrode 21, the counter electrode 23, and the at least one working electrode 22 may be in direct contact with the inner surface 101 of the tube body 10 or other intermediate layers may exist, which is not limited by the embodiments of the present disclosure. For example, the reference electrode 21, the counter electrode 23, and the at least one working electrode 22 are connected with the inner surface 101 of the tube body 10 by soldering, laser welding, bonding, etc.

For example, any one selected from the group consisting of the first lead-out electrode 11, the second lead-out electrode 12, and the third lead-out electrode 13 may be electrically connected with the corresponding one of the reference electrode 21, the working electrode 22, and the counter electrode 23 through a via hole at a side wall of the tube body 10.

For example, the centrifuge tube according to at least one embodiment of the present disclosure may further include a lead wire, one end of the lead wire is electrically connected with any one selected from the group consisting of the reference electrode 21, the working electrode 22, and the counter electrode 23, and another end of the lead wire is electrically connected with the corresponding one of the first lead-out electrode 11, the second-out lead electrode 12, and the third lead-out electrode 13.

Figure 12A:
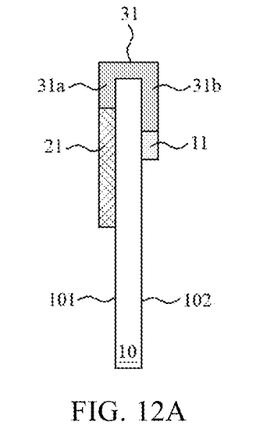
FIG. 12A, FIG. 12B and FIG. 12C are schematic structural diagrams respectively illustrating a first lead wire, a second lead wire, and a third lead wire extending from an inner surface to an outer surface of a centrifuge tube provided by at least one embodiment of the present disclosure.
Figure 12B:
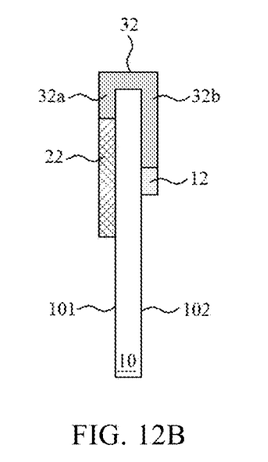
Figure 12C:
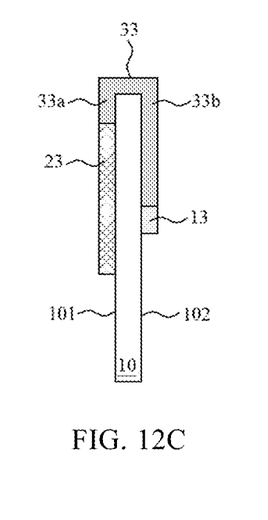

For example, as shown in FIG. 12A to FIG. 12C, the lead wire may extend out of the centrifuge tube along the inner surface 101 of the tube body 10 of the centrifuge tube from any one selected from the group consisting of the reference electrode 21, the working electrode 22, and the counter electrode 23, and then be bent backward and extend along the outer surface 102 of the tube body 10 of the centrifuge tube to the corresponding one of the first lead-out electrode 11, the second lead-out electrode 12, and the third lead-out electrode 13.

For example, referring to FIG. 3, FIG. 4 and FIG. 12A to FIG. 12C, a centrifuge tube according to at least one embodiment of the present disclosure includes a first lead wire 31, a second lead wire 32, and a third lead wire 33. The first lead wire 31 includes a first portion 31a extending along the inner surface 101 of the tube body 10 and a second portion 31b extending along the outer surface 102 of the tube body 10. The second lead wire 32 includes a first portion 32a extending along the inner surface 101 of the tube body 10 and a second portion 32b extending along the outer surface 102 of the tube body 10. The third lead wire 33 includes a first portion 33a extending along the inner surface 101 of the tube body 10 and a second portion 33b extending along the outer surface 102 of the tube body 10.

It should be noted that the embodiments of the present disclosure do not limit the specific connection mode between the first lead-out electrode and the reference electrode, as long as the first lead-out electrode can lead out the electrical signal of the reference electrode. Similarly, the embodiments of the present disclosure do not limit the specific connection mode between the second lead-out electrode and the working electrode, and the specific connection mode between the third lead-out electrode and the counter electrode.

In the embodiments of the present disclosure, after the substance to be detected is placed into the centrifuge tube for the centrifugal treatment, precipitate will be at the bottom of the tube body of the centrifuge tube, and supernatant liquid will be above the precipitate. An electrochemical sensor is attached to the inner surface of the tube body of the centrifuge tube, so that the electrochemical sensor can contact with the supernatant liquid and detect the supernatant liquid, thereby reducing the interference of precipitate on detection results and improving detection accuracy. For example, an electrochemical sensor can generate an electrical signal proportional to the concentration of analyte in the substance to be detected. By processing the electrical signal, the concentration of analyte in the substance to be detected can be obtained according to the magnitude of the electrical signal, and the electrochemical sensor can detect the concentration of analyte. The detection speed is fast, the detection result is accurate, and meanwhile the operation is simple and portable, which reduces the detection cost.

As shown in FIG. 3, in some embodiments, the electrochemical sensor may be arranged closer to the opening of the tube body 10 relative to the bottom of the tube body 10. For example, the electrochemical sensor may be arranged in the upper half, the upper one-third, the upper quarter, etc., of the tube body 10, which is not limited by the embodiments of the present disclosure. By arranging the electrochemical sensor closer to the opening of the tube body 10 relative to the bottom of the tube body 10, the electrochemical sensor can only contact with the supernatant liquid, but not with the precipitate, thus reducing the interference of the precipitate to the detection result and improving the detection accuracy.

The first lead-out electrode is electrically connected with the reference electrode, and the first lead-out electrode leads out the electric signal of the reference electrode. The second lead-out electrode is electrically connected with the working electrode, and the second lead-out electrode leads out the electric signal of the working electrode. The third lead-out electrode is electrically connected with the counter electrode, and the third lead-out electrode leads out the electric signal of the counter electrode. The first lead-out electrode, the second lead-out electrode, and the third lead-out electrode are arranged at the outer surface of the tube body, so that the electric signal generated by the electrochemical sensor arranged at the inner surface of the tube body during the detection process can be led out for further processing, and the detection result can be obtained. The first lead-out electrode, the second lead-out electrode, and the third lead-out electrode are arranged at intervals, so that interference of signals among the reference electrode, the working electrode, and the counter electrode is avoided, and the accuracy of the detection result is improved.

The electrochemical sensor includes at least one working electrode. In the case where a plurality of working electrodes are provided, a plurality of analytes can be simultaneously detected, so that the detection efficiency is improved. The plurality of working electrodes are in one-to-one correspondence with the second lead-out electrodes, that is, one working electrode corresponds to one second lead-out electrode. In the case where there are a plurality of working electrodes, there are also a plurality of second lead-out electrodes, the number of the plurality of working electrodes is the same as the number of the plurality of working electrodes, and the plurality of second lead-out electrodes can respectively lead out the electrical signals of the plurality of working electrodes, thus achieving the purpose of detecting the plurality of analytes.

For example, the first lead-out electrode 11, the second lead-out electrode 12, and the third lead-out electrode 13 are all ring-shaped electrodes extending at least partially along the circumferential direction of the outer surface of the tube body 10. In some embodiments, the ring-shaped electrodes may include a bare ring-shaped conductive material that is not covered by an insulation layer. Alternatively, the ring-shaped electrode may include a ring-shaped conductive material partially covered with an insulation layer. For example, in FIG. 1, the first lead-out electrode 11, the second lead-out electrode 12, and the third lead-out electrode 13 are all shown as ring-shaped electrodes circumferentially extend for one turn along the outer surface of the tube body 10, but it should be understood that the embodiments of the present disclosure are not limited thereto. The above conductive material may be, for example, metal, indium tin oxide, indium zinc oxide, etc., which is not limited by embodiments of the present disclosure.

In addition, it should be understood that although the first lead-out electrode 11, the second lead-out electrode 12, and the third lead-out electrode 13 in the drawings of this application are all ring-shaped electrodes extending circumferentially along the outer surface of the tube body 10, in other embodiments, some of the first lead-out electrode 11, the second lead-out electrode 12, and the third lead-out electrode 13 may be ring-shaped electrodes extending circumferentially along the outer surface of the tube body 10, while the other electrodes of the first lead-out electrode 11, the second lead-out electrode 12, and the third lead-out electrode 13 have other shapes, which is not limited by embodiments of the present disclosure.

Figure 2:
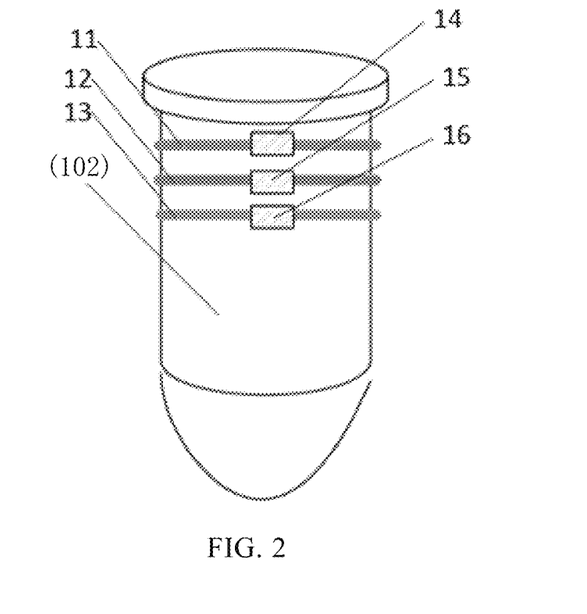
FIG. 2 is a schematic structural diagram of a centrifuge tube according to at least one embodiment of the present disclosure.

In the embodiments of the present disclosure, for example, in the case where all the first lead-out electrode, the second lead-out electrode, and the third lead-out electrode are bare ring-shape electrodes that are not covered by an insulation layer, the centrifuge tube rotates at any angle, and the first lead-out electrode, the second lead-out electrode, and the third lead-out electrode can be coupled with the detection device, which is convenient for coupling the first lead-out electrode, the second lead-out electrode, and the third lead-out electrode with the detection device, thereby transmitting the electrical signals of the reference electrode, the working electrode, and the counter electrode to the detection device. The electric signals are further processed by the detection device to obtain the detection result, thereby improving the detection speed. FIG. 2 is another schematic structural diagram of a centrifuge tube according to at least one embodiment of the present disclosure. Referring to FIG. 2, the centrifuge tube according to at least one embodiment of the present disclosure may further include a pad or a spring pressing sheet electrically connected with the ring-shape electrodes. A first pad or a first spring pressing sheet 14, a second pad or a second spring pressing sheet 15, and a third pad or a third spring pressing sheet 16 are arranged at the outer side wall of the tube body 10 at intervals; the first pad or the first spring pressing sheet 14 is electrically connected with the first lead-out electrode 11, the second pad or the second spring pressing sheet 15 is electrically connected with the second lead-out electrode 12, and the third pad or the third spring pressing sheet 16 is electrically connected with the third lead-out electrode 13.

In the embodiments of the disclosure, the first pad, the second pad, and the third pad are arranged at the outer side wall of the tube body at intervals, which can improve the connection reliability and facilitate the coupling of the first pad, the second pad, and the third pad with the detection device, thereby transmitting the electrical signals of the reference electrode, the working electrode, and the counter electrode to the detection device, and further processing the electrical signals by the detection device to obtain detection results and improve the detection speed.

In the embodiments of the present disclosure, in the case where the detection device is coupled with the centrifuge tube, the first spring pressing sheet, the second spring pressing sheet, and the third spring pressing sheet enables the first lead-out electrode, the second lead-out electrode, and the third lead-out electrode to form stable electrical connection with the detection device, thus avoiding the problem of the influence on the detection result due to that some of the first lead-out electrode, the second lead-out electrode, and the third lead-out electrode have poor contact with the detection device, and improving the stability and reliability of the detection result.

Figure 6:
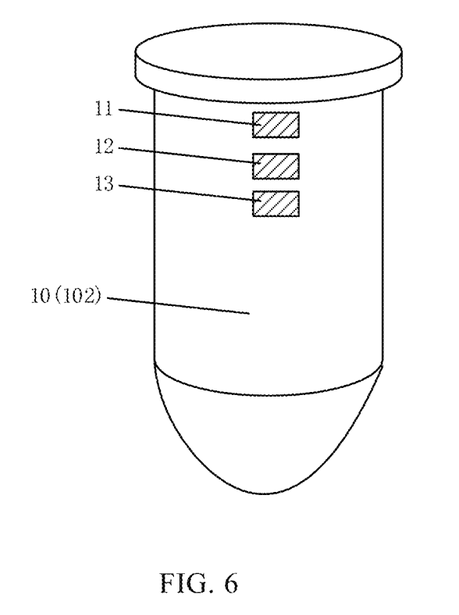
FIG. 6 is another structural diagram of a centrifuge tube provided by at least one embodiment of the present disclosure.

FIG. 6 is another structural diagram of a centrifuge tube provided by at least one embodiment of the present disclosure. As shown in FIG. 6, the first lead-out electrode 11, the second lead-out electrode 12, and the third lead-out electrode 13 may also be directly formed in the form of pads or spring pressing sheets. The connection modes of the first lead-out electrode 11, the second lead-out electrode 12, and the third lead-out electrode 13 with the reference electrode 21, the working electrode 22, and the counter electrode 23 in FIG. 6, respectively, can be the same as the connection modes descried in other embodiments of the present disclosure, which will not be described in detail here.

It should be understood that although the first lead-out electrode 11, the second lead-out electrode 12, and the third lead-out electrode 13 are all in the form of pads or spring pressing sheets in FIG. 6, in other embodiments, some of the first lead-out electrode 11, the second lead-out electrode 12, and the third lead-out electrode 13 can be directly formed in the form of pads or spring pressing sheets, while other electrodes of the first lead-out electrode 11, the second lead-out electrode 12, and the third lead-out electrode 13 can have other forms, such as ring-shaped electrodes, which are not limited by the embodiments of the present disclosure.

For example, the working electrode 22 is provided with a reactant or a catalyst corresponding to the analyte in the substance to be detected, and the reactant or the catalyst can chemically react with the analyte in the substance to be detected to generate an electrical signal. By processing the electrical signal, the concentration of the analyte in the substance to be detected can be obtained according to the magnitude of the electrical signal.

In an embodiment of the present disclosure, an electrochemical sensor includes at least one working electrode. In the case where the electrochemical sensor includes a plurality of working electrodes, different reactants or catalysts can be arranged on the plurality of working electrodes respectively, and the plurality of working electrodes are configured for detecting different analytes respectively, so that a plurality of analytes in the substance to be detected can be detected at the same time, and the detection efficiency is improved.

For example, in FIG. 3, the electrochemical sensor includes one working electrode 22, and the one working electrode 22 can detect one analyte in the substance to be detected. For example, in FIG. 5, the electrochemical sensor includes two working electrodes 22, and the two working electrodes 22 can simultaneously detect two analytes in the substance to be detected. For example, the working electrode 22 may be provided with any one selected from the group consisting of lactate oxidase, glucose oxidase, urate oxidase, etc.

For example, the substance to be detected may be saliva, blood, urine, etc., which is not limited by embodiments of the present disclosure.

For example, the analyte can be any one selected from the group consisting of glucose, lactate, and urea, etc.

In the embodiments of the present disclosure, as an example, saliva is used as the substance to be detected, concentration of lactate in saliva can be detected by lactate oxidase, concentration of glucose in saliva can be detected by glucose oxidase, and concentration of urea in saliva can be detected by urate oxidase. In the case where the electrochemical sensor comprises one working electrode, any one selected from the group consisting of lactate oxidase, glucose oxidase, and urate oxidase may be arranged on the working electrode to detect the concentration of a corresponding analyte in saliva. For example, lactate oxidase may be arranged on the working electrode to detect the concentration of the corresponding analyte, such as lactate in saliva; glucose oxidase may be arranged on the working electrode to detect the concentration of glucose in saliva, and urate oxidase may also be arranged on the working electrode to detect the concentration of urea in saliva. In the case where the electrochemical sensor includes two working electrodes, any two of the lactate oxidase, glucose oxidase, and urate oxidase may be respectively arranged on the two working electrodes, thereby simultaneously detecting the concentration of two corresponding analytes in saliva and improving the detection efficiency. For example, lactate oxidase may be arranged on one working electrode and glucose oxidase may be arranged on the other working electrode to detect the concentration of lactate and the concentration of glucose in saliva simultaneously. For example, lactate oxidase may be arranged on one working electrode and urate oxidase may be arranged on the other working electrode to detect the concentration of lactic acid and the concentration of urea in saliva simultaneously. For example, glucose oxidase may be arranged on one working electrode, and urate oxidase may be arranged on the other working electrode to detect the concentration of glucose and the concentration of urea in saliva simultaneously.

It should be noted that the case where the substance to be detected is blood or urine is similar to the case where the substance to be detected is saliva, therefore, the detailed description of the case where the substance to be detected is blood or urine is omitted here.

Figure 7:
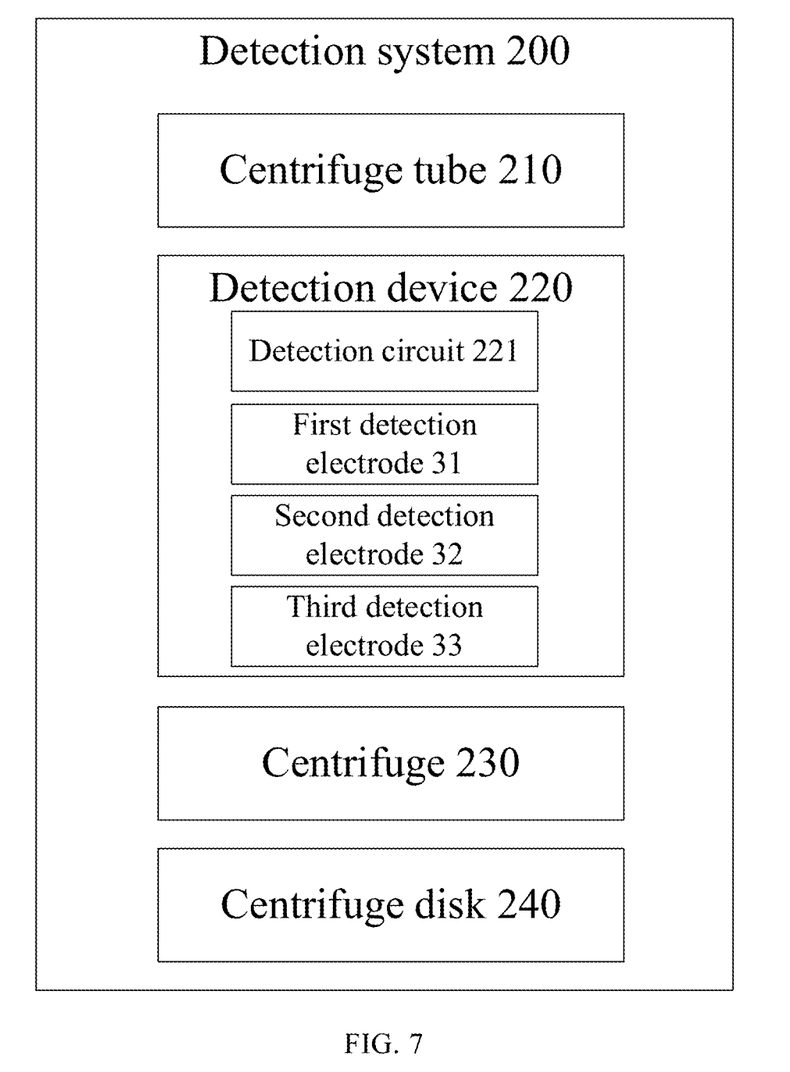
FIG. 7 is a schematic block diagram of a detection system according to at least one embodiment of the present disclosure.
Figure 8:
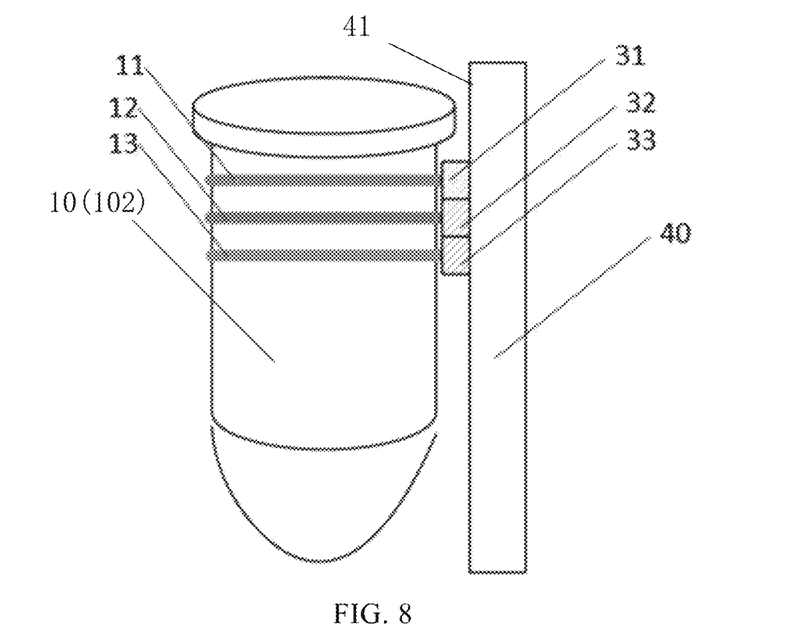
FIG. 8 is a structural diagram of a detection system according to at least one embodiment of the present disclosure.
Figure 9:
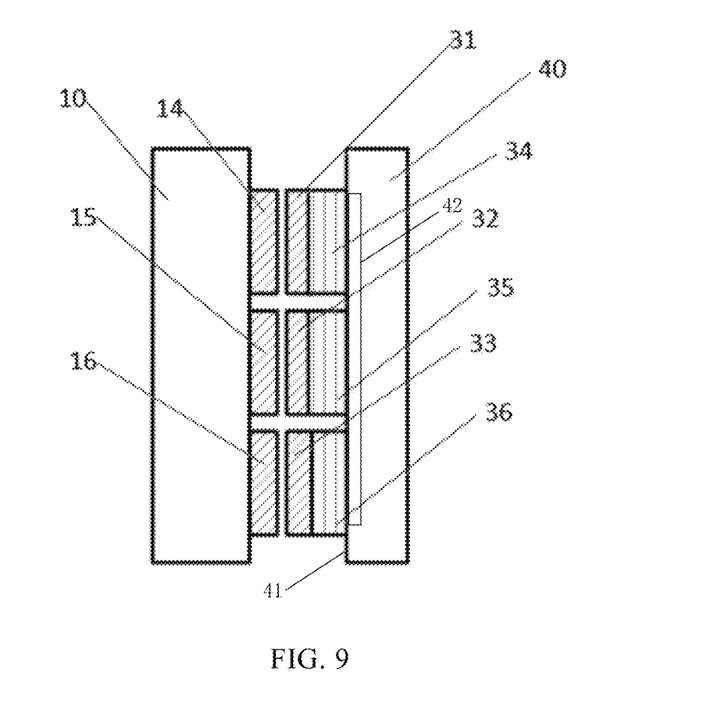
FIG. 9 is another structural diagram of a detection system according to at least one embodiment of the present disclosure.
Figure 10:
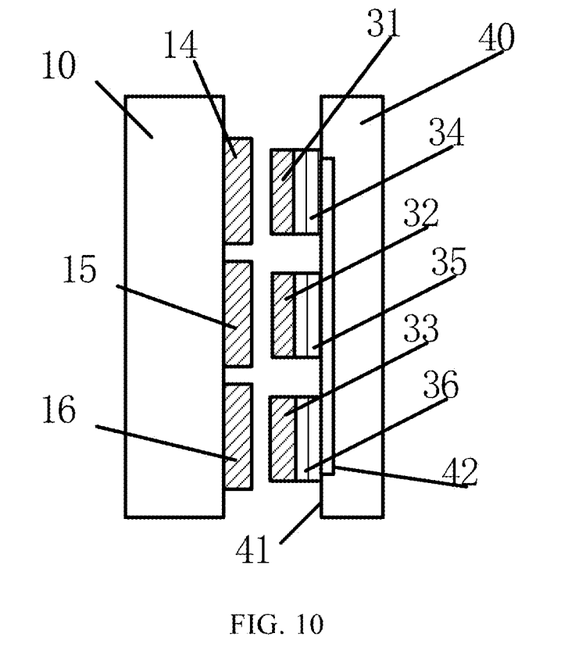
FIG. 10 is another structural diagram of a detection system according to at least one embodiment of the present disclosure.

FIG. 7 is a schematic block diagram of a detection system according to at least one embodiment of the present disclosure. FIG. 8 is a structural diagram of a detection system according to at least one embodiment of the present disclosure. FIG. 9 is another structural diagram of a detection system according to at least one embodiment of the present disclosure. FIG. 10 is another structural diagram of a detection system according to at least one embodiment of the present disclosure. Referring to FIG. 7 to FIG. 9, a detection system 200 according to at least one embodiment of the present disclosure includes a centrifuge tube 210 and a detection device 220. The centrifuge tube 210 may be the centrifuge tube described in any one of embodiments of the present disclosure.

The detection device 220 is configured to be signally connected with the centrifuge tube 210 to process an electrical signal from the sensor of the centrifuge tube 210.

In an embodiment of the present disclosure, the detection device processes electrical signals from an electrochemical sensor (for example, a reference electrode, a working electrode, and a counter electrode of the electrochemical sensor) of the centrifuge tube, thereby obtaining a detection result. The detection device and the centrifuge tube are arranged separately, so that in the case where the analyte in the centrifuge tube is centrifuged, the components moving together with the centrifuge tube are reduced, thereby reducing the influence on the detection device, prolonging the service life of the detection device and improving the accuracy of the detection result.

For example, the detection system 200 further includes a centrifuge 40 and a centrifuge disk 240 rotatably connected with the centrifuge 40.

The centrifugal disk 240 is configured to fix the centrifuge tube 210. The centrifuge 40 includes a side wall 41, and the detection device 220 is provided on the side wall. While the centrifuge 40 centrifuge the substance to be detected in the centrifuge tube 210, the centrifuge tube 210 is fixed on the centrifuge disk 240, and the detection device 220 is fixed on the side wall 41 of the centrifuge 40.

In an embodiment of the present disclosure, the substance to be detected is placed into the centrifuge tube, the centrifuge tube is fixed on a centrifuge disk, and the centrifuge performs a centrifugal treatment on the substance to be detected. After the centrifugal treatment is completed, the centrifugal disk stops rotating. A detection device arranged at the side wall of the centrifuge is electrically connected with the first lead-out electrode, the second lead-out electrode, and the third lead-out electrode of the centrifuge tube. The detection device processes the electrical signal of the electrochemical sensor to obtain the detection result of the substance to be detected, which is simple to operate and convenient for detecting the substance to be detected.

For example, the detection device 220 includes a detection circuit 221, a first detection electrode 31, a second detection electrode 32, and a third detection electrode 33. The first detection electrode 31 is configured to be electrically connected with the first lead-out electrode 11, the second detection electrode 32 is configured to be electrically connected with the second lead-out electrode 12, the third detection electrode 33 is configured to be electrically connected with the third lead-out electrode 13. The first detection electrode 31, the second detection electrode 32, and the third detection electrode 33 are signally connected with the detection circuit 221.

In the embodiment of the present disclosure, the first detection electrode 31 is electrically connected with the first lead-out electrode 11 to transmit the electrical signal of the reference electrode to the detection circuit, the second detection electrode 32 is electrically connected with the second lead-out electrode 12 in one-to-one correspondence to transmit the electrical signal of the working electrode to the detection circuit, the third detection electrode 33 is electrically connected with the third lead-out electrode 13 to transmit the electrical signal of the counter electrode to the detection circuit, and the detection circuit processes electrical signals of the electrochemical sensor to obtain detection result of the substance to be detected.

For example, the position of the first detection electrode 31 is in one-to-one correspondence with the position of the first lead-out electrode 11, the position of the second detection electrode 32 is in one-to-one correspondence with the position of the second lead-out electrode 12, and the position of the third detection electrode 33 is in one-to-one correspondence with the position of the third lead-out electrode 13.

In the detection system of the embodiments of the present disclosure, it is convenient to couple the first detection electrode with the first lead-out electrode, couple the second detection electrode with the second lead-out electrode, and couple the third detection electrode with the third lead-out electrode, thus improving the detection speed and efficiency.

As shown in FIG. 9 and FIG. 10, in some embodiments, the detection system 200 further includes a first elastic member 34, a second elastic member 35, and a third elastic member 36. For example, the first detection electrode 31 is connected with the side wall 41 of the centrifuge 40 through the first elastic member 34, the second detection electrode 32 is connected with the side wall 41 of the centrifuge 40 through the second elastic member 35, and the third detection electrode 33 is connected with the side wall 41 of the centrifuge 40 through the third elastic member 36.

As shown in FIG. 9 and FIG. 10, in some embodiments, the detection system 200 further includes an electromagnet 42. The electromagnet 42 is fixedly connected with the centrifuge 40, and is configured to, under the condition of being electrified, attract the first detection electrode 31, the second detection electrode 32, and the third detection electrode 33 toward the side wall 41. Although only one electromagnet 42 is shown in FIG. 9 and FIG. 10, it should be understood that the detection system 200 in other embodiments may include a plurality of electromagnets for attracting the first detection electrode 31, the second detection electrode 32, and the third detection electrode 33 toward the side wall 41, respectively.

As shown in FIG. 9, in some embodiments, the projections of the first detection electrode 31, the second detection electrode 32, and the third detection electrode 33 on the first pad or the first spring pressing sheet 14, the second pad or the second spring pressing sheet 15, and the third pad or the third spring pressing sheet 16, respectively, basically coincides with the first pad or the first spring pressing sheet 14, the second pad or the second spring pressing sheet 15, and the third pad or the third spring pressing sheet 16. As shown in FIG. 10, in other embodiments, the projections of the first detection electrode 31, the second detection electrode 32, and the third detection electrode 33 on the first pad or the first spring pressing sheet 14, the second pad or the second spring pressing sheet 15, and the third pad or the third spring pressing sheet 16, respectively, falls within the region where the first pad or the first spring pressing sheet 14, the second pad or the second spring pressing sheet 15, and the third pad or the third spring pressing sheet 16 are located respectively to save materials.

In the embodiment of the present disclosure, while the centrifuge performs a centrifugal treatment on the substance to be detected, the electromagnet is electrified and attracts the first detection electrode, the second detection electrode, and the third detection electrode. In this case, the first elastic member, the second elastic member, and the third elastic member are in a compressed state, and the first detection electrode, the second detection electrode, and the third detection electrode are not in contact with the centrifuge tube. That is, the first detection electrode is not in contact with the first lead-out electrode, the first pad, or the first spring pressing sheet; the second detection electrode is not in contact with the second lead-out electrode, the second pad, or the second spring pressing sheet; and the third detection electrode is not in contact with the third lead-out electrode, the third pad, or the third spring pressing sheet. After the centrifugal treatment is finished, the power supplied to the electromagnet is interrupted; and under elastic forces of the first elastic member, the second elastic member, and the third elastic member, the first detection electrode, the second detection electrode, and the third detection electrode move towards the centrifuge tube, and the first detection electrode, the second detection electrode, and the third detection electrode are appressed against the outer surface of the centrifuge tube, thus making the first detection electrode contact with the first lead-out electrode, as well as the first pad or the first spring pressing sheet, making the second detection electrode contact with the second lead-out electrode as well as the second pad or the second pressing sheet, and making the third detection electrode contact with the third lead-out electrode as well as the third pad or the third spring pressing sheet. In this way, the electric signal of the electrochemical sensor is transmitted to the detection circuit, and then processed by the detection circuit to obtain a detection result, so that the operation is simple.

At least one embodiment of the present disclosure provides a detection method, and the detection method is applicable to the detection system described in any one of embodiments of the present disclosure. The detection method includes:

placing an substance to be detected into the centrifuge tube, performing a centrifugal treatment to obtain supernatant liquid and precipitate, and making the first electrode group of the sensor contact with the supernatant liquid in the centrifuge tube;

electrically connecting the second electrode group with the detection device;

processing the electric signal of the sensor by using the detection device to obtain a value of a target parameter of an analyte in the substance to be detected.

For example, the second electrode group includes at least one first lead-out electrode, at least one second lead-out electrode, and at least one third lead-out electrode; in this case, the electrically connecting the second electrode group with the detection device includes:

abutting the detection device against the outer surface of the centrifuge tube;

detecting that the detection device does not receive the electric signal of the sensor;

rotating the centrifuge tube, so that the detection device is signally connected with the at least one first lead-out electrode, the at least one second lead-out electrode, and the at least one third lead-out electrode.

Figure 11:
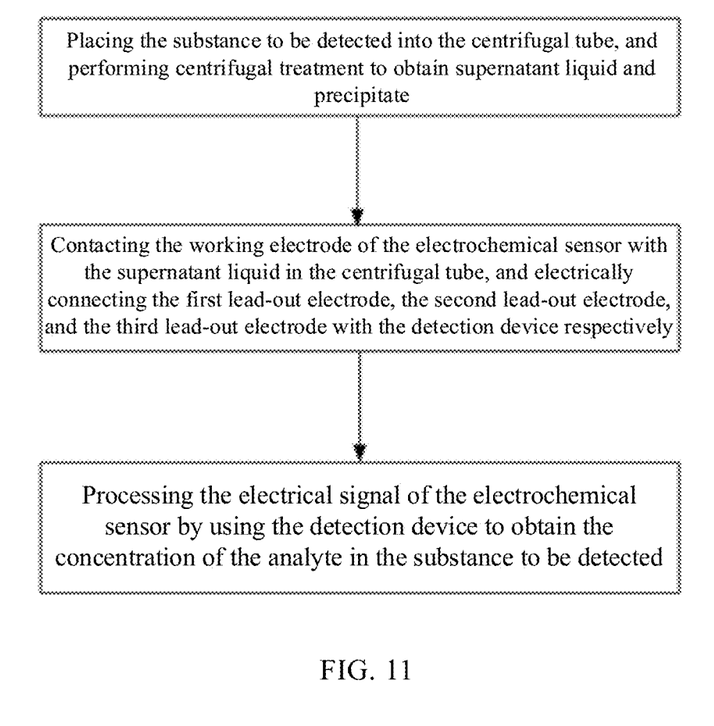
FIG. 11 is a flowchart of an example of a detection method according to at least one embodiment of the present disclosure.

FIG. 11 is a flowchart of an example of a detection method according to at least one embodiment of the present disclosure. Referring to FIG. 11, a detection method according to at least one embodiment of the present disclosure includes the following steps:

placing the substance to be detected into a centrifuge tube, and performing centrifugal treatment to obtain supernatant liquid and precipitate;

contacting the working electrode of the electrochemical sensor with the supernatant liquid in the centrifuge tube, and electrically connecting the first lead-out electrode, the second lead-out electrode, and the third lead-out electrode with the detection device respectively;

processing the electrical signal of the electrochemical sensor by using the detection device to obtain the concentration of the analyte in the substance to be detected.

In the embodiments of the present disclosure, the substance to be detected is placed into the centrifuge tube, the centrifuge centrifugates the substance to be detected, and the electrochemical sensor detects the supernatant liquid obtained after centrifugal treatment, so that the detection result is more accurate. The detection device obtains the electrical signals of the electrochemical sensor through the first lead-out electrode, the second lead-out electrode, and the third lead-out electrode, and the detection device processes the electrical signals to obtain the value of target parameter, such as concentration, reaction time, etc., of the analyte in the substance to be detected, so that the operation is simple, the detection cost is reduced, and the reagent consumed in the detection process is reduced.

For example, the electrically connecting the first lead-out electrode, the second lead-out electrode, and the third lead-out electrode with the detection device respectively includes: abutting the detection device against the outer surface of the centrifuge tube, and detecting whether the detection device receives the electrical signal of the electrochemical sensor; if the detection device receives the electrical signal of the electrochemical sensor, completing the electrical connection, if the detection device does not receive the electrical signal of the electrochemical sensor, rotating the centrifuge tube until the detection device receives the electrical signal of the electrochemical sensor.

In an embodiment of the present disclosure, in the case where the first lead-out electrode, the second lead-out electrode, and the third lead-out electrode are ring-shape electrodes, the first detection electrode, the second detection electrode, and third detection electrode of the detection device abut against the outer surface of the centrifuge tube, so that the first detection electrode, the second detection electrode, and third detection electrode of the detection device can contact with the first lead-out electrode, the second lead-out electrode, and the third lead-out electrode respectively without rotating the centrifuge tube, thus the detection device can receive the electrical signal of the electrochemical sensor. In the case where a first pad, a second pad, and a third pad are arranged at the outer surface of the tube body at intervals, or in the case where a first spring pressing sheet, a second spring pressing sheet, and a third spring pressing sheet are arranged at the outer surface of the tube body at intervals, the first detection electrode, the second detection electrode, and third detection electrode of the detection device abut against the outer surface of the centrifuge tube, the first detection electrode, the second detection electrode, and third detection electrode of the detection device are not connected with the first pad or the first spring pressing sheet, the second pad or the second spring pressing sheet, the third pad or the second spring pressing sheet, the centrifuge tube needs to be rotated, and the centrifuge tube may be rotated by, but not limited to, 1 degree/step, 5 degrees/step, 10 degrees/step, 15 degrees/step, etc. By adjusting the position of the centrifuge tube, the detection device is in contact with the first pad or the first spring pressing sheet, the second pad or the second spring pressing sheet, and the third pad or the third spring pressing sheet, so that the detection device can receive electrical signals of the reference electrode, the working electrode, and the counter electrode of the electrochemical sensor.

Although general descriptions and specific implementations have been used in above context to describe the present disclosure in detail, some modifications or improvements can be made on the basis of the embodiments of the present disclosure, which is obvious to those skilled in the art. Accordingly, all these modifications or improvements made without departing from the spirit of the present disclosure fall within the scope of protection claimed by the present disclosure.

What is claimed is:
1. A centrifuge tube comprising:
   a tube body, comprising an inner surface and an outer surface;
   a sensor, provided at the inner surface of the tube body and comprising a first electrode group; and
   a second electrode group, provided at the outer surface of the tube body and electrically connected with the first electrode group;

wherein:
the sensor comprises an electrochemical sensor, and the first electrode group comprises at least one reference electrode, at least one counter electrode, and at least one working electrode,
the second electrode group comprises at least one first lead-out electrode, at least one second lead-out electrode, and at least one third lead-out electrode,
the at least one first lead-out electrode, the at least one second lead-out electrode, and the at least one third lead-out electrode are provided at intervals at the outer surface of the tube body, and
the at least one first lead-out electrode is electrically connected with the at least one reference electrode in one-to-one correspondence, the at least one second lead-out electrode is electrically connected with the at least one working electrode in one-to-one correspondence, and the third lead-out electrode is electrically connected with the at least one counter electrode in one-to-one correspondence; and
wherein at least one selected from the group consisting of the at least one first lead-out electrode, the at least one second lead-out electrode, and the at least one third lead-out electrode is a ring-shaped electrode extending at least partially along a circumferential direction of the outer surface of the tube body.

2. The centrifuge tube according to claim 1, wherein:
the ring-shaped electrode comprises a ring-shaped conductive material partially covered with an insulation layer.

3. The centrifuge tube according to claim 1, further comprising:
at least one first pad, at least one second pad, and at least one third pad, which are arranged at intervals at the outer surface of the tube body,
wherein the at least one first pad is electrically connected with the at least one first lead-out electrode in one-to-one correspondence, the at least one second pad is electrically connected with the at least one second lead-out electrode in one-to-one correspondence, and the at least one third pad is electrically connected with the at least one third lead-out electrode in one-to-one correspondence.

4. The centrifuge tube according to claim 1, further comprising:
at least one first spring pressing sheet, at least one second spring pressing sheet, and at least one third spring pressing sheet, which are arranged at intervals at the outer surface of the tube body,
wherein the at least one first spring pressing sheet is electrically connected with the at least one first lead-out electrode in one-to-one correspondence, the at least one second spring pressing sheet is electrically connected with the at least one second lead-out electrode in one-to-one correspondence, and the at least one third spring pressing sheet is electrically connected with the at least one third lead-out electrode in one-to-one correspondence.

5. The centrifuge tube according to claim 1, wherein:
the at least one working electrode is provided with a reactant or a catalyst corresponding to an analyte in a substance to be detected, the electrochemical sensor comprises at least two working electrodes, and the at least two working electrodes are configured to respectively detect different analytes in the substance to be detected.

6. The centrifuge tube according to claim 5, wherein:
the reactant or the catalyst comprises any one selected from the group consisting of lactate oxidase, glucose oxidase, and urate oxidase.

7. The centrifuge tube according to claim 5, wherein the substance to be detected is saliva, blood, or urine.

8. The centrifuge tube according to claim 5, wherein the analyte comprises any one selected from the group consisting of glucose, lactate, and urea.

9. The centrifuge tube according to claim 1, wherein:
relative to a bottom of the tube body, the electrochemical sensor is closer to an opening of the tube body.

10. The centrifuge tube according to claim 1, further comprising:
a lead wire, p1 wherein one end of the lead wire is electrically connected with any one selected form the group consisting of the at least one reference electrode, the at least one working electrode, and the at least one counter electrode, and another end of the lead wire is electrically connected with a corresponding one of the at least one first lead- out electrode, the at least one second lead-out electrode, and the at least one third lead-out electrode, and
the lead wire comprises a first portion extending along the inner surface of the tube body and a second portion extending along the outer surface of the tube body.

11. A detection system, comprising:
a detection device; and
a centrifuge tube, comprising:
a tube body, comprising an inner surface and an outer surface;
a sensor, provided at the inner surface of the tube body and comprising a first electrode group; and
a second electrode group, provided at the outer surface of the tube body and electrically connected with the first electrode group;
wherein the detection device is configured to be signally connected with the centrifuge tube to process an electrical signal provided by the sensor;
wherein:
the sensor comprises an electrochemical sensor, and the first electrode group comprises at least one reference electrode, at least one counter electrode, and at least one working electrode,
the second electrode group comprises at least one first lead-out electrode, at least one second lead-out electrode, and at least one third lead-out electrode,
the at least one first lead-out electrode, the at least one second lead-out electrode, and the at least one third lead-out electrode are provided at intervals at the outer surface of the tube body, and
the at least one first lead-out electrode is electrically connected with the at least one reference electrode in one-to-one correspondence, the at least one second lead-out electrode is electrically connected with the at least one working electrode in one-to-one correspondence, and the third lead-out electrode is electrically connected with the at least one counter electrode in one-to-one correspondence; and
wherein at least one selected from the group consisting of the at least one first lead-out electrode, the at least one second lead-out electrode, and the at least one third lead-out electrode is a ring-shaped electrode extending at least partially along a circumferential direction of the outer surface of the tube body.

12. The detection system according to claim 11, further comprising:
a centrifuge; and
a centrifugal disk, rotatably connected with the centrifuge,
wherein the centrifugal disk is configured to fix the centrifuge tube, and the centrifuge comprises a side wall, and the detection device is provided at the side wall.

13. The detection system according to claim 12, wherein:
the detection device comprises a detection circuit, at least one first detection electrode, at least one second detection electrode, and at least one third detection electrode;
the at least one first detection electrode is configured to be electrically connected with the at least one first lead-out electrode in one-to-one correspondence, the at least one second detection electrode is configured to be electrically connected with the second lead-out electrode in one-to-one correspondence, the at least one third detection electrode is configured to be electrically connected with the third lead-out electrode in one-to-one correspondence; and
the at least one first detection electrode, the at least one second detection electrode, and the at least one third detection electrode are signally connected with the detection circuit.

14. The detection system according to claim 13, wherein a position of the at least one first detection electrode is in one-to-one correspondence with a position of the at least one first lead-out electrode, a position of the at least one second detection electrode is in one-to-one correspondence with a position of the at least one second lead-out electrode, a position of the at least one third detection electrode is in one-to-one correspondence with a position of the at least one third lead-out electrode.

15. The detection system according to claim 13, further comprising:
at least one first elastic member, at least one second elastic member, and at least one third elastic member,
wherein the at least one first detection electrode is connected with the side wall of the centrifuge through the at least one first elastic member in one-to-one correspondence, the at least one second detection electrode is connected with the side wall of the centrifuge through the at least one second elastic member in one-to-one correspondence, and the at least one third detection electrode is connected with the side wall of the centrifuge through the at least one third elastic member in one-to-one correspondence.

16. The detection system according to claim 15, further comprising:
an electromagnet,
wherein the electromagnet is connected with the centrifuge, and the electromagnet is configured to, under a condition of being electrified, attract the at least one first detection electrode, the at least one second detection electrode, and the at least one third detection electrode toward the side wall.

17. A detection method of a detection system:
wherein the detection system comprises: a detection device and a centrifuge tube, and the centrifuge tube comprises:
a tube body, comprising an inner surface and an outer surface;
a sensor, provided at the inner surface of the tube body and comprising a first electrode group; and
a second electrode group, provided at the outer surface of the tube body and electrically connected with the first electrode group,
wherein:
the sensor comprises an electrochemical sensor, and the first electrode group comprises at least one reference electrode, at least one counter electrode, and at least one working electrode,
the second electrode group comprises at least one first lead-out electrode, at least one second lead-out electrode, and at least one third lead-out electrode,
the at least one first lead-out electrode, the at least one second lead-out electrode, and the at least one third lead-out electrode are provided at intervals at the outer surface of the tube body, and
the at least one first lead-out electrode is electrically connected with the at least one reference electrode in one-to-one correspondence, the at least one second lead-out electrode is electrically connected with the at least one working electrode in one-to-one correspondence, and the third lead-out electrode is electrically connected with the at least one counter electrode in one-to-one correspondence; and
wherein at least one selected from the group consisting of the at least one first lead-out electrode, the at least one second lead-out electrode, and the at least one third lead-out electrode is a ring-shaped electrode extending at least partially along a circumferential direction of the outer surface of the tube body;
the detection device is configured to be signally connected with the centrifuge tube to process an electrical signal provided by the sensor,
wherein the detection method comprises:
placing a substance to be detected into the centrifuge tube, performing a centrifugal treatment to obtain a supernatant liquid and a precipitate, and making the first electrode group of the sensor contact with the supernatant liquid in the centrifuge tube;
electrically connecting the second electrode group with the detection device; and
processing the electrical signal of the sensor by using the detection device to obtain a value of a target parameter of an analyte in the substance to be detected.

18. The detection method according to claim 17, wherein:
the electrically connecting the second electrode group with the detection device comprises:
abutting the detection device against the outer surface of the centrifuge tube;
detecting that the detection device does not receive the cicctric electrical signal of the sensor; and
rotating the centrifuge tube, so that the detection device is signally connected with the at least one first lead-out electrode, the at least one second lead-out electrode, and the at least one third lead-out electrode.

* * * * *

UNITED STATES PATENT AND TRADEMARK OFFICE
CERTIFICATE OF CORRECTION

| | | |
|---|---|---|
| PATENT NO. | : 11,904,320 B2 | Page 1 of 1 |
| APPLICATION NO. | : 17/279161 | |
| DATED | : February 20, 2024 | |
| INVENTOR(S) | : Lin Zhu | |

It is certified that error appears in the above-identified patent and that said Letters Patent is hereby corrected as shown below:

In the Claims

In Claim 10, Line 3, "... a lead wire, p1 wherein ..." should be corrected to "... a lead wire, wherein ..."

Signed and Sealed this
Sixteenth Day of July, 2024

Katherine Kelly Vidal
*Director of the United States Patent and Trademark Office*